United States Patent
Crane et al.

[11] Patent Number: 6,078,473
[45] Date of Patent: Jun. 20, 2000

[54] GIMBAL FLEXURE FOR USE WITH MICROACTUATOR

[75] Inventors: Peter Crane; Adam Karl Himes, both of Richfield; David Allen Sluzewski, Edina; Kevin John Schulz; David Gordon Qualey, both of Apple Valley, all of Minn.

[73] Assignee: Seagate Technology, Inc., Scotts Valley, Calif.

[21] Appl. No.: 09/078,588

[22] Filed: May 13, 1998

Related U.S. Application Data

[60] Provisional application No. 60/073,529, Feb. 3, 1998.

[51] Int. Cl.$^7$ ..................................... G11B 5/55
[52] U.S. Cl. ............................ 360/104; 360/109
[58] Field of Search ....................... 360/104, 106, 360/109

[56] References Cited

U.S. PATENT DOCUMENTS

| | | | |
|---|---|---|---|
| 4,605,977 | 8/1986 | Matthews | 360/103 |
| 4,620,251 | 10/1986 | Gitzendanner | 360/103 |
| 4,651,242 | 3/1987 | Hirano et al. | 360/103 |
| 4,853,810 | 8/1989 | Pohl et al. | 360/103 |
| 4,962,391 | 10/1990 | Kitahara et al. | 346/140 |
| 5,021,906 | 6/1991 | Chang et al. | 360/103 |
| 5,034,828 | 7/1991 | Ananth et al. | 360/75 |
| 5,065,268 | 11/1991 | Hagen | 360/104 |
| 5,072,240 | 12/1991 | Miyazawa et al. | 346/140 |
| 5,079,659 | 1/1992 | Hagen | 360/104 |
| 5,105,408 | 4/1992 | Lee et al. | 369/44.15 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,552,809 | 9/1996 | Hosono et al. | 347/10 |
| 5,657,188 | 8/1997 | Jurgenson et al. | 360/106 |

(List continued on next page.)

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator-Based, Two-Stage Servo System" by Fan et al., *IEEE Transactions on Industrial Electronics*, vol. 42, No. 3, Jun. 1995.

"A Flexural Piggyback Milli-Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS-Based HDD Slider" by Imamura et al, *IEEE* 1996.

"An Experiment for Head Positioning System Using Sub-micron Track-width GMR Head" by Yoshikawa et al., *IEEE Transactions on Magnetics*, vol. 32, No. 5, Sep. 1996.

"Micro Electrostatic Actuators in Dual-Stage Disk Drives with High Track Density" by Tang et al., *IEEE Transations on Magnetics*, vol. 32, No. 5, Sep. 1996.

"Piezoelectric Microactuator Compensating for Off-Track Errors in Magnetic Disk Drives" by Imamura et al, *Advance Information Storage Systems*, vol. 5, pp. 119–125.

"A Dual-Stage Magnetic Disk Drive Actuator Using a Piezoelectric Device for a High Track Density" by Mori et al., *IEEE Transactions on Magnetics*, vol. 27, No. 6, Nov. 1991.

(List continued on next page.)

*Primary Examiner*—Jefferson Evans
*Attorney, Agent, or Firm*—Kinney & Lange, P.A.

[57] ABSTRACT

A disc drive has a recording disc rotatable about an axis and a slider supporting a transducing head for transducing data with the disc. A dual-stage actuation assembly supports the slider to position the transducing head adjacent a selected radial track of the disc, and includes a movable actuator arm and a load beam connected to the actuator arm. A flexure is connected to the load beam for supporting the slider, and includes first conductive traces terminating at first bond pads and at least one second conductive trace electrically connected to the transducing head. A microactuator includes a rotor operatively connected to the slider for radially moving the transducing head and a stator connected to the flexure at the first bond pads.

19 Claims, 12 Drawing Sheets

U.S. PATENT DOCUMENTS

| | | | |
|---|---|---|---|
| 5,745,319 | 4/1998 | Takekado et al. | 360/104 |
| 5,764,444 | 6/1998 | Imamura et al. | 360/109 |
| 5,781,381 | 7/1998 | Koganezawa et al. | 360/106 |
| 5,793,571 | 8/1998 | Jurgenson et al. | 360/104 |
| 5,796,558 | 8/1998 | Hanrahan et al. | 360/106 |
| 5,805,382 | 9/1998 | Lee et al. | 360/104 |
| 5,896,246 | 4/1999 | Budde et al. | 360/104 |
| 5,898,541 | 4/1999 | Boutaghou et al. | 360/109 |
| 5,898,544 | 4/1999 | Krinke et al. | 360/104 |
| 5,936,805 | 8/1999 | Imaino | 360/104 |
| 5,959,808 | 9/1999 | Fan et al. | 360/106 |

OTHER PUBLICATIONS

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al, *Journal of Microelectromechanical Systems*, vol. 4, No. 1, Mar. 1995.

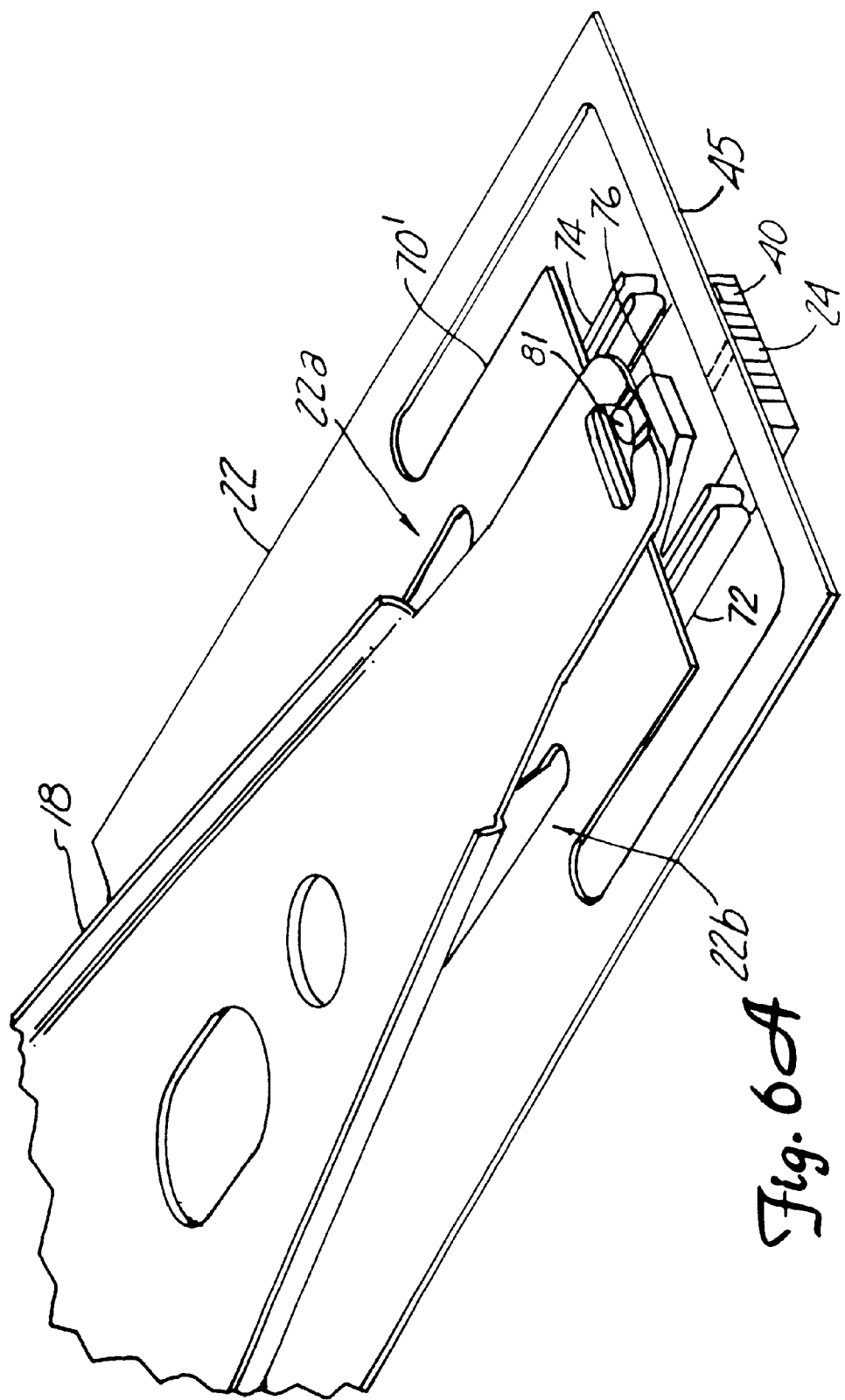

GIMBAL FLEXURE FOR USE WITH MICROACTUATOR

CROSS-REFERENCE TO RELATED APPLICATION(S)

This application claims priority from Provisional Application No. 60/073,529, filed Feb. 3, 1998 entitled "Flex Gimbal Supporting Disc Drive Micro-Actuator" by P. Crane, A. Himes, D. Sluzewski, K. Schulz and D. Qualey.

BACKGROUND OF THE INVENTION

The present invention relates to a disc drive microactuation system, and more particularly to a gimbal flexure for mechanically supporting and electrically connecting a microactuator for achieving high resolution positioning of a transducing head supported by a slider in a disc drive system.

The density of concentric data tracks on magnetic discs continues to increase (that is, the radial spacing between data tracks is decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

Various microactuator locations and designs have been considered to achieve high resolution head positioning. One promising design involves inserting a silicon-based thin film structure between the suspension and the slider in a disc drive assembly. The microactuator includes, for example, an electromagnetic transducer having magnetic core materials forming a stator and a rotor, with conductive coils wrapped around the stator core in a solenoid-type or planar-type configuration. One of the technical challenges in implementing such a microactuator is to provide sufficiently large actuation force to overcome friction forces and spring bias forces to accelerate the head enough to acconmmodate the required bandwidth. Such a design must be realized in a relatively small wafer area, to keep costs reasonable and to allow easy integration into the disc drive design. It would also be useful for the microactuator to include a position sensor to discern the relative position of the movable portion of the microactuator.

A microactuator design achieving superior actuation force in a small wafer area is disclosed in U.S. application Ser. No. 09/010,100 filed Jan. 21, 1998 entitled "Magnetic Microactuator and Inductive Position Sensor Having Shaped Pole Configuration" by L. Zhang, P. Ryan and P. Crane, which is hereby incorporated by reference. A microactuator suspension for interfacing the improved microactuator motor with the mechanical requirements of a disc drive is disclosed in U.S. application Ser. No. 09/071,611 filed May 1, 1998 entitled "Electromagnetic Disc Drive Microactuator and Suspension" by L. Zhang, P. Crane and R. Resh, which is hereby incorporated by reference. There is a continuing need in the art for a gimbal flexure design to interface the improved microactuator and suspension with other disc drive components to achieve precise, high performance head positioning.

BRIEF SUMMARY OF THE INVENTION

The present invention is a dual-stage actuation assembly for use in a disc drive having a recording disc rotatable about an axis and a slider supporting a transducing head for transducing data with the disc. The dual-stage actuation assembly supports the slider to position the transducing head adjacent a selected radial track of the disc, and includes a movable actuator arm and a load beam connected to the actuator arm. A flexure is connected to the load beam for supporting the slider, and includes first conductive traces terminating at first bond pads and at least one second conductive trace electrically connected to the transducing head. A microactuator includes a rotor operatively connected to the slider for radially moving the transducing head and a stator connected to the flexure at the first bond pads.

BRIEF DESCRIPTION OF THE DRAWINGS

FIG. 6A is a top perspective view of a disc drive microactuation system for positioning a slider over tracks of a disc including a gimbal flexure according to a second embodiment of the present invention.

DETAILED DESCRIPTION

Figure 1:
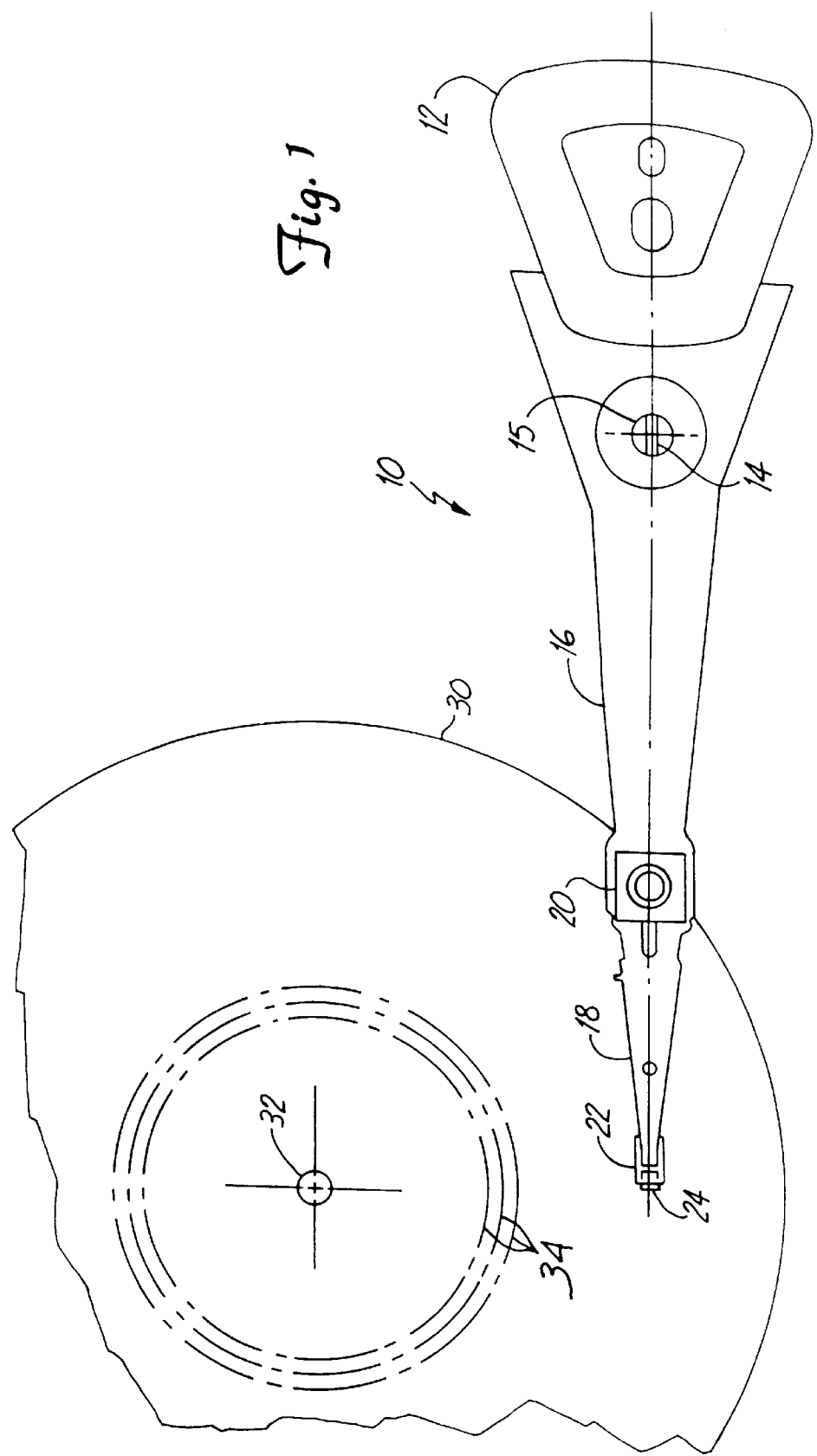
FIG. 1 is a plan view of a disc drive actuation system for positioning a slider over tracks of a disc.

FIG. 1 is a plan view of a disc drive actuation system 10 for positioning slider 24 over a selected track 34 of disc 30. Actuation system 10 includes voice coil motor (VCM) 12 arranged to rotate actuator arm 16 around axis 14 on spindle 15. Head suspension 18 is connected to actuator arm 16 at head mounting block 20. Flexure 22 is connected to an end of head suspension load beam 18, and carries slider 24. Slider 24 carries a transducing head (not shown in FIG. 1)

for reading and/or writing data on concentric tracks 34 of disc 30. Disc 30 rotates around axis 32, so that windage is encountered by slider 24 to keep it aloft a small distance above the surface of disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head on slider 24 precisely over a selected track 34 of disc 30. Therefore, a higher resolution actuation device is necessary.

Figure 2:
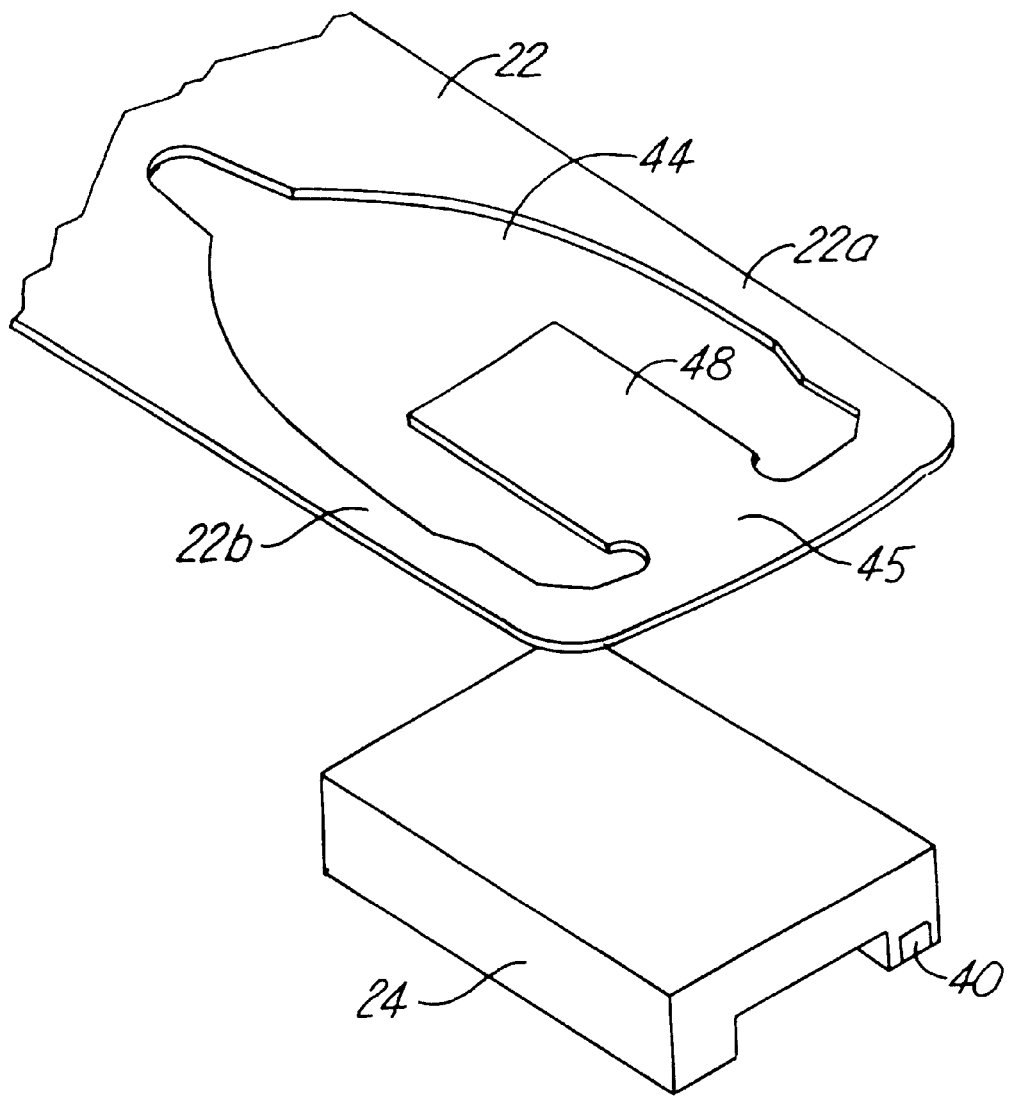
FIG. 2 is an exploded perspective view of a portion of the disc drive actuation system shown in FIG. 1, illustrating the relationship between the flexure and the slider.

FIG. 2 is an exploded perspective view of a portion of the disc drive actuation system shown in FIG. 1, showing flexure 22 and slider 24. Flexure 22 is mounted to the underside of a distal end of load beam 18 (FIG. 1). Flexure 22 includes arms 22a and 22b forming aperture 44 therebetween to provide resilience and gimbaling spring to flexure 22. The distal end of arms 22a and 22b are connected via cross beam 45. Central tongue 48 extends from cross beam 45 into aperture 44 in a plane generally parallel to a plane defined by flexure arms 22a and 22b. The top surface of slider 24 is attached, such as by adhesive, to tongue spring 48. Flexure 22 therefore extends completely beyond slider 24.

Figure 3:
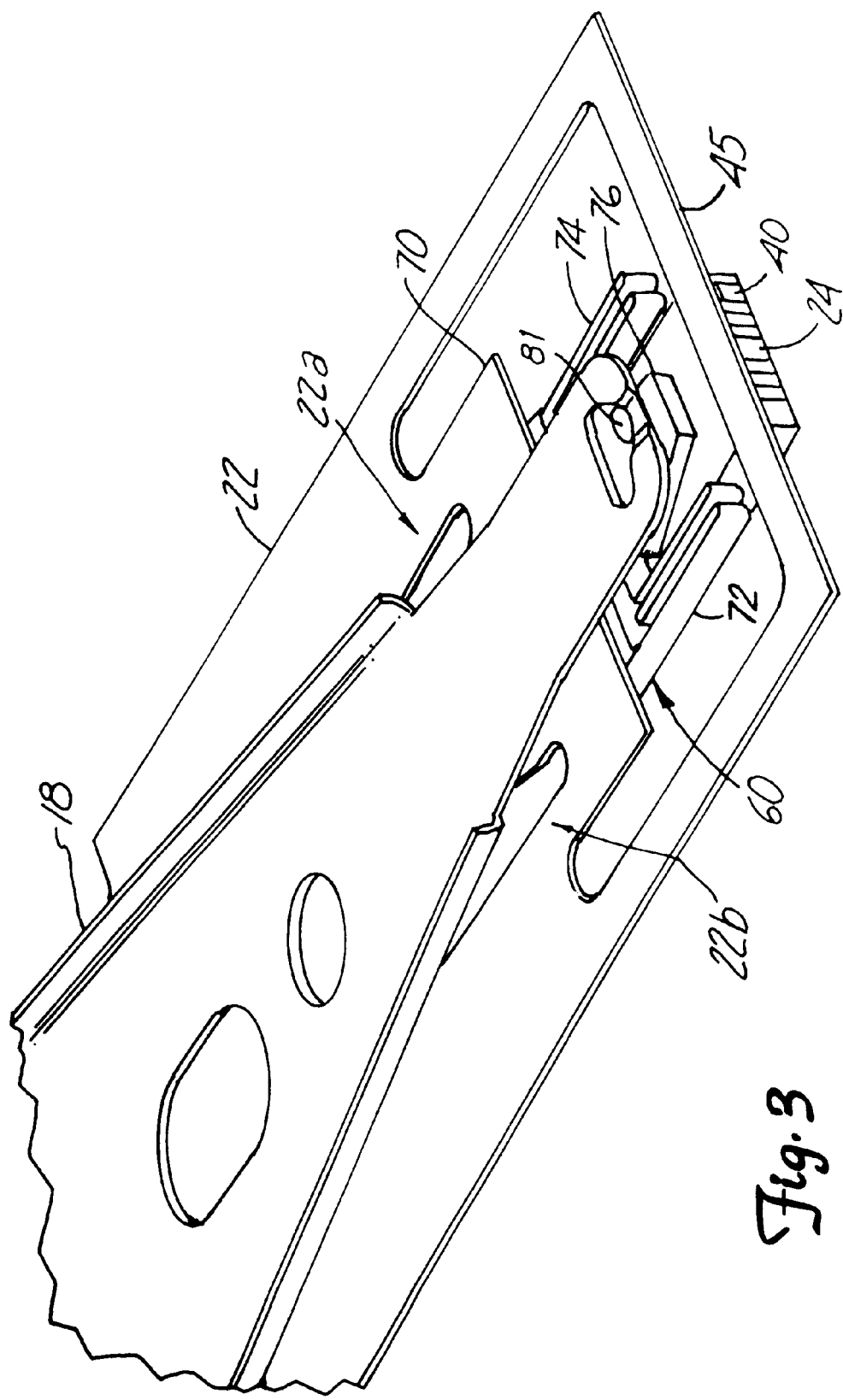
FIG. 3 is a top perspective view of a disc drive microactuation system for positioning a slider over tracks of a disc including a gimbal flexure according to a first embodiment of the present invention.
Figure 4:
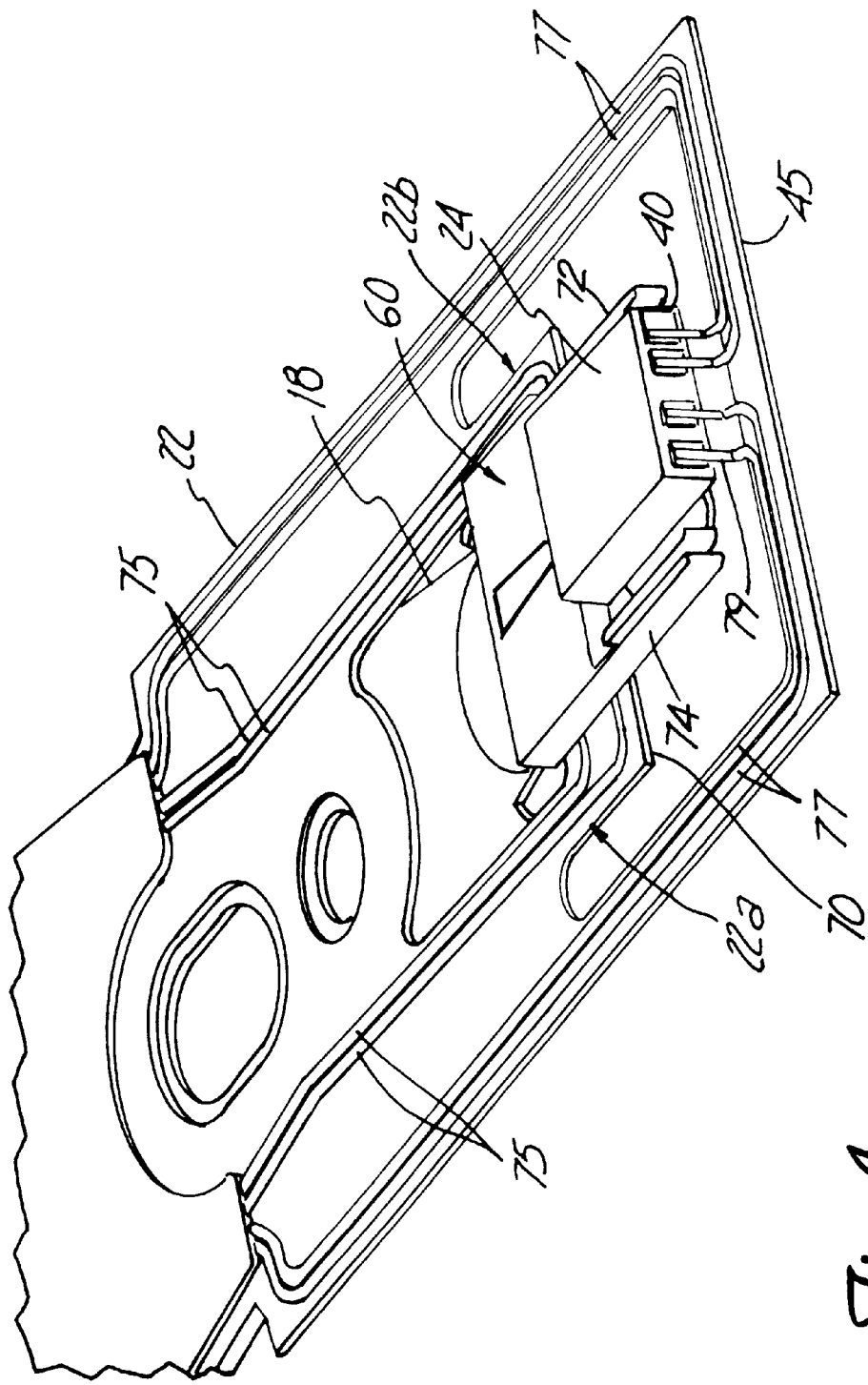
FIG. 4 is a bottom perspective view of the disc drive microactuation system shown in FIG. 3.
Figure 5:
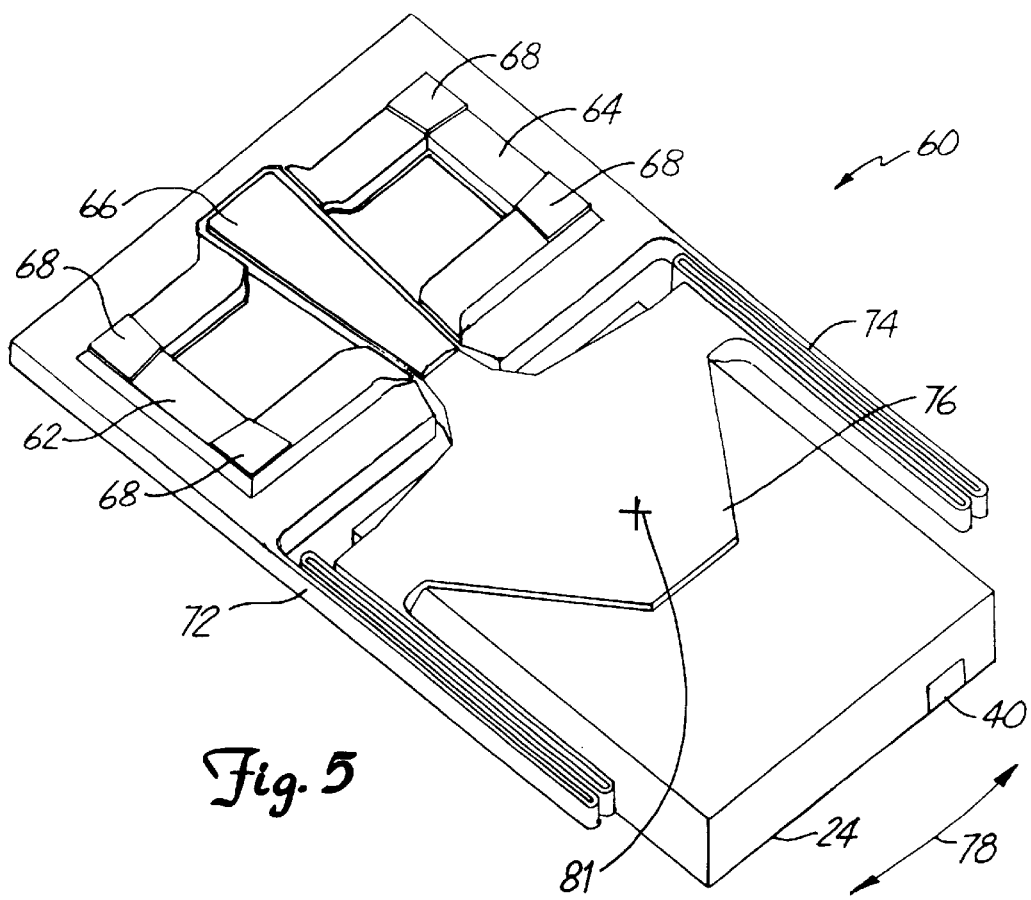
FIG. 5 is a perspective view of a microactuator configured between the flexure and the slider of the disc drive microactuation system shown in FIG. 3.

FIG. 3 is a top perspective view, and FIG. 4 is a bottom perspective view of a disc drive microactuation system for positioning slider 24 over tracks of a disc according to the present invention. FIG. 5 is a perspective view of microactuator 60 and its associated suspension configured between flexure 22 and slider 24 in the disc drive microactuation system. Flexure 22 is mounted to the underside of a distal end of load beam 18 in a conventional manner. Flexure 22 includes arms 22a and 22b forming an aperture therebetween to provide resilience and gimbaling spring to flexure 22. Flexure 22 further includes tongue portion 70 in substantially the same plane as flexure arms 22a and 22b. The distal end of arms 22a and 22b are connected via tongue portion 70.

Microactuator 60 includes first stator 62 and second stator 64, with bond pads 68 providing access to contact first and second stators 62 and 64. Rotor 66 is formed between first and second stators 62 and 64, and is movable with respect to the stators. A "silicon suspension" is provided, including flexible arms 72 and 74 extending from the body of the stator portion of microactuator 60 and connecting on opposite sides to central tongue 76, which is a slider bond pad attached to a distal end of rotor 66 and attached to slider 24 by an adhesive, for example. Pre-load force is applied through central tongue 76 to slider 24 at pre-load point 81. Therefore, operation of microactuator 60 translationally moves rotor 66 with respect to first and second stators 62 and 64, which in turn forces bending of arms 72 and 74 and alters the position of central tongue 76, moving transducing head with respect to flexure 22 in the direction of arrows 78, to radially position head 40 over a radial data track of a rotating disc below slider 24.

Electrical and mechanical connections to bond pads 68 are made by conductive traces 75 on the underside of flexure 22, which terminate and make contact at bond pads 68 on stators 62 and 64. Conductive traces 77 are also patterned on the underside of flexure 22 to contact transducing head 40. Electrical connections between transducing head 40 and conductive traces 77 are made by flexible conducting wires 79, to permit movement of slider 24 with respect to cross beam 45 of flexure 22. Thus, the microactuator may be readily connected to an external microactuator control circuit and transducing head 40 may be readily connected to external signal processing circuitry, both connections being provided through conductive traces or other electrical connection techniques on flexure 22.

The silicon suspension connecting the rotor and the stator of microactuator 60 is formed with two thicknesses of silicon. The first is the thickness of arms 72 and 74, which is typically 100–200 microns, and the second is the thickness of central tongue 76, which is typically 25–50 microns. Central tongue 76 may be formed with less thickness than arms 72 and 74 by silicon etching methods such as potassium hydroxide (KOH) wet etching, Reactive Ion Etching (RIE), or Deep Trench Reactive Ion Etching (DTRIE). The lesser thickness of central tongue 76 allows slider 24 to be recessed into the silicon suspension, reducing the overall package height of microactuator 60. The low package height allows more discs to be stacked and packaged in a given disc drive form factor, increasing the total amount of data that may be stored in the disc drive.

Arms 72 and 74 of the silicon suspension are etched from the full silicon wafer thickness (100–200 microns), as described above. For reference purposes, a Cartesian coordinate system may be defined with a longitudinal axis roughly parallel to the length of slider 24 (parallel to the velocity of the rotating disc), a lateral or transverse axis in the "offtrack" direction roughly parallel to the width of slider 24 (normal to the disc velocity on the surface of the rotating disc), and a vertical axis roughly parallel to the height of slider 24 (normal to the surface of the rotating disc). Ideally, the silicon suspension should be compliant in the offtrack direction to allow movement due to small microactuation force, but stiff in the pitch and roll directions to maintain the alignment of the air gap between rotor 66 and stators 62 and 64 as microactuator 60 and slider 24 follow the topography of a rotating disc as a relatively rigid assembly.

In one embodiment, the longitudinal length of the portion of flexure 22 supporting stators 62 and 64 (that is, the length of flexure 22 supporting conductive traces 75 extending as far as tongue portion 70) is about half as long as the total longitudinal length of flexure 22 supporting conductive traces 77 extending to transducing head 40. This arrangement causes the offtrack stiffness at transducing head 40 to be about 8 times less than the offtrack stiffness on stators 62 and 64 of microactuator 60, so that flexure 22 provides minimal offtrack stiffness to oppose the microactuation force exerted on rotor 66 to position transducing head 40. Offtrack stiffness at transducing head 40 may be further reduced by cutting cross beam 45 of flexure 22 at its center, such as with a scalpel during assembly.

Figure 6B:
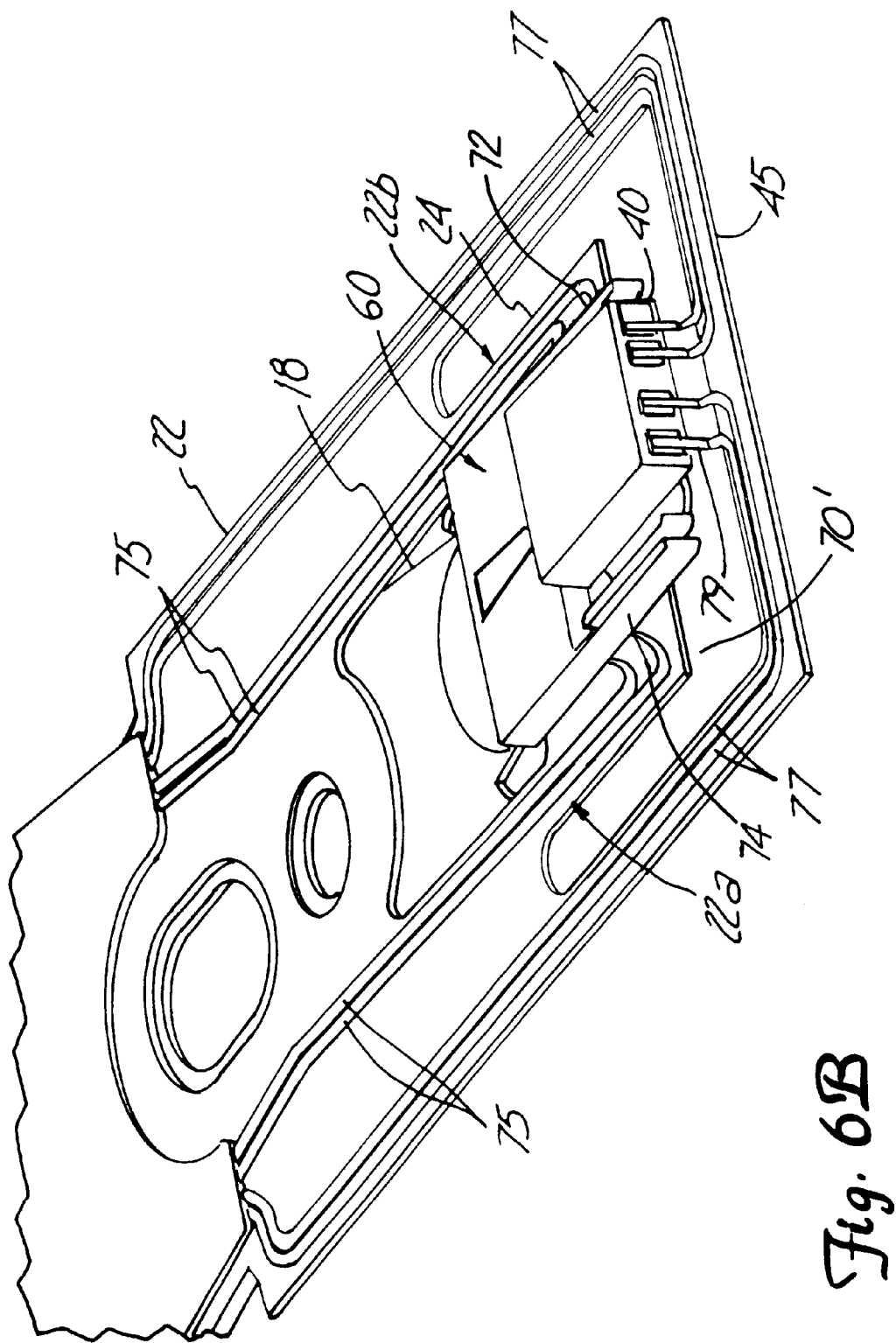
FIG. 6B is a bottom perspective view of the disc drive microactuation system shown in FIG. 6A.

As shown in FIGS. 3 and 4, conductive traces 75 for powering microactuator 60 approach the microactuator terminals represented by bond pads 68 from the outside, providing relatively high offtrack stiffness and also high roll stiffness. The high offtrack stiffness at microactuator 60 is desirable to prevent unwanted offtrack movement of the microactuator assembly with respect to actuator arm 16 (FIG. 1) during large-scale actuation, but the high roll stiffness may potentially be somewhat problematic, since the microactuator and head assembly must be sufficiently flexible in the pitch and roll directions to follow the disc topography. FIG. 6A is a top perspective view, and FIG. 6B is a bottom perspective view of a disc drive microactuation system including flexure 22 configured to reduce roll stiffness according to a second embodiment of the present invention. Flexure 22 includes extended tongue portion 70', which is longer in the longitudinal dimension than tongue portion 70 shown in FIGS. 3 and 4. As illustrated in FIG. 6B, conductive traces 75 extend on tongue portion 70' beyond bond pads 68 and curve back in a horseshoe shape to connect to bond pads 68. This arrangement reduces the roll stiffness at microactuator 60, allowing the microactuator and head assembly to more readily follow the disc topography.

An important factor involved in designing the microactuator and the flex gimbal to account for the forces applied to the microactuator and head assembly is the application of the air-bearing pre-load force onto slider 24. Pre-load force is applied to balance the air-bearing pressurization force generated at the slider-to-disc interface, thereby maintaining slider 24 a predetermined glide height above the surface of the rotating disc. The pre-load force may be applied at several points, and the microactuator suspension and flex gimbal design must be tailored to the choice of pre-load point. Several possibilities for application of pre-load force and the associated flex gimbal are discussed below.

Pre-Load Applied to the Rotor

The simplest application of pre-load force to slider 24 is induced directly to the rotor through central tongue 76, as shown in FIG. 5. A conventional load beam 18 (see FIG. 1) bears on central tongue 76 at pre-load point 81. Pre-load force is applied to the rotor and is carried directly from the point of application through the rotor to slider 24. Since there is no stress due to pre-loading, arms 72 and 74 of the silicon suspension may be made very compliant in the offtrack direction to permit movement of slider 24 by a relatively small microactuation force, and flexure 22 must include an aperture through which load beam 18 may bear on central tongue 76.

Figure 7:
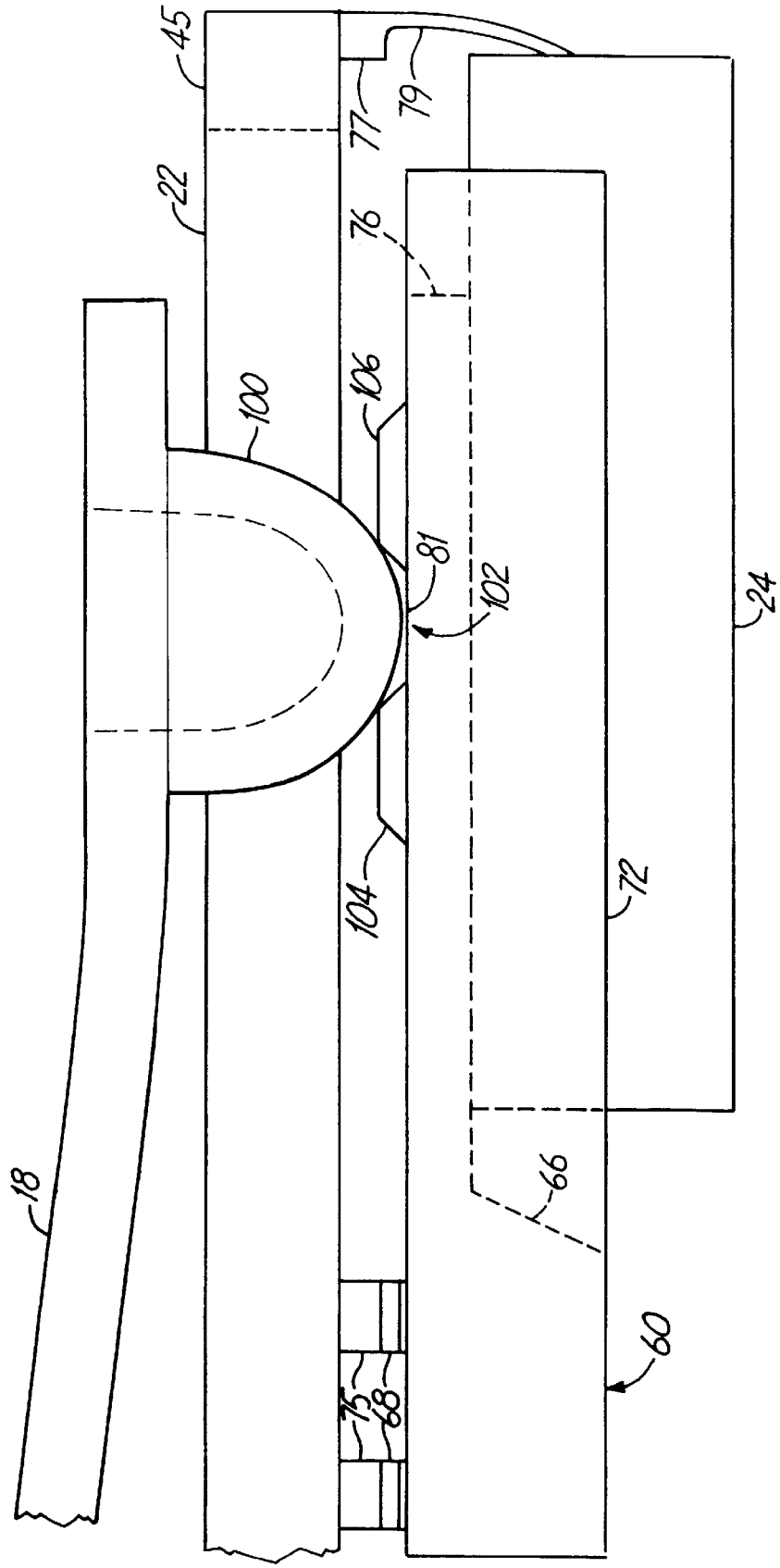
FIG. 7 is a side view of a dimple and raceway interface between the load beam and the rotor.

FIG. 7 is a side view of a pre-loading arrangement for use with the microactuator suspension of the present invention. Load beam 18 is formed with dimple 100 protruding toward slider 24, to apply pre-load force through an aperture in flexure 22 to tongue 76 at pre-load point 81. Hollow dimple 100 preferably has a height of about 6–8 milli-inches. A raceway 102 is formed on tongue 76 to receive dimple 100 and facilitate rotational movement thereof with respect to tongue 76. Raceway 102 is formed by etching raceway walls 104 and 106 on the overcoat material of tongue 76 around pre-load point 81. Raceway 102 also acts as a reservoir for lubricants such as high-temperature grease to reduce friction associated with movement of dimple 100 with respect to tongue 76.

Figure 8:
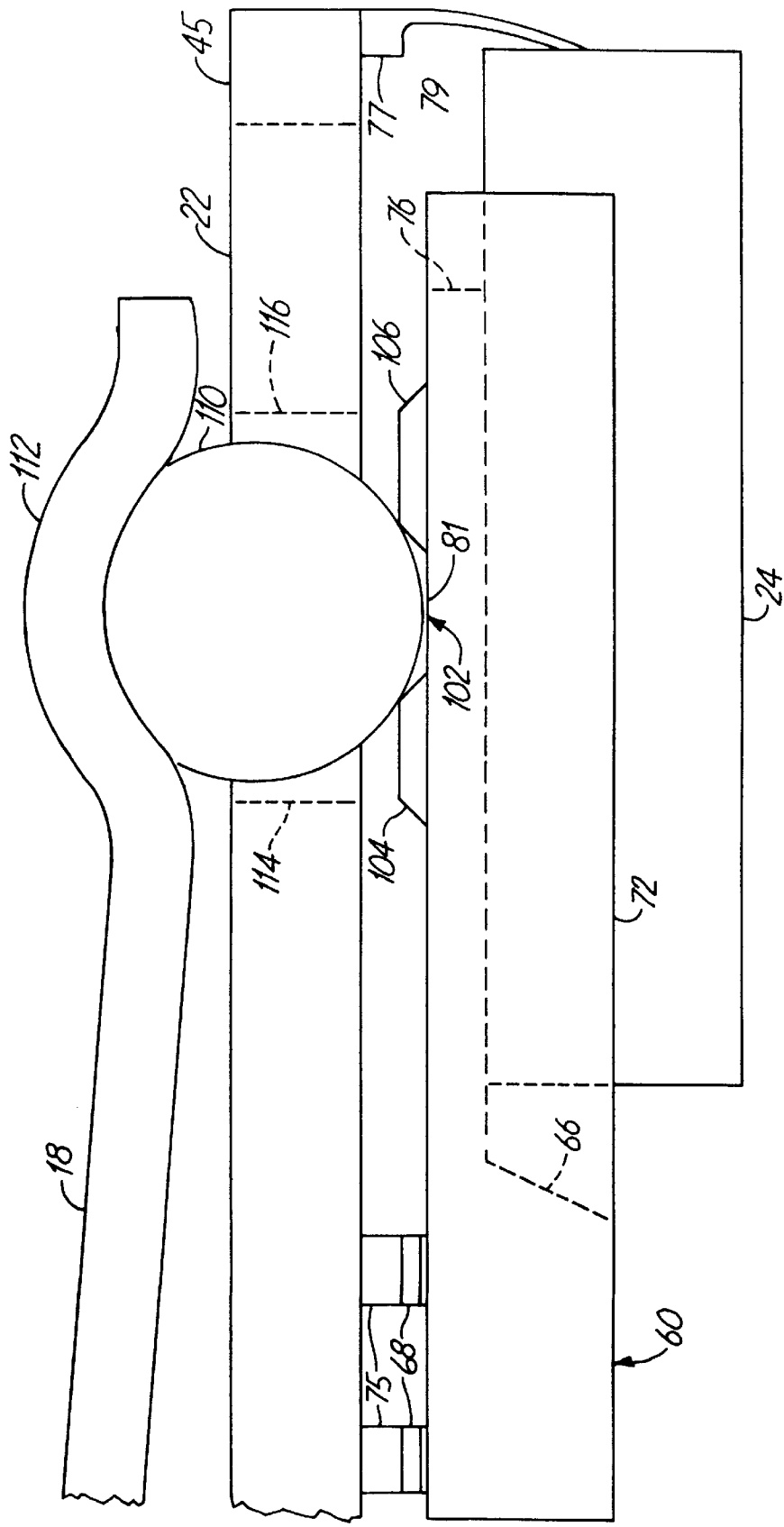
FIG. 8 is a side view of a ball and raceway interface between the load beam and the rotor.

FIG. 8 is a side view of an alternate pre-loading arrangement for use with the microactuator and suspension of the present invention. Load beam 18 is formed with a curved portion 112, and raceway 102 is formed by etching raceway walls 104 and 106 on tongue 76 around pre-load point 81. A ceramic ball 110 is interposed in an aperture in flexure 22 between load beam 18 and tongue 76, movably situated in raceway 102 formed on tongue 76 and the raceway created by curved portion 112 of load beam 18. Ball 110 may be composed of silicon nitride, or may be composed of steel and coated with silicon carbide, for example. Ball 110 is preferably 8–10 milli-inches in diameter, with curved portion 112 having a height of about 2 milli-inches. Lubricants may be applied to ball 110 and/or raceway 102 to reduce friction. Walls 114 and 116 are formed in flexure 22 to contain ball 110 and prevent it from escaping raceway 102 and the raceway formed by curved portion 112 of load beam 18.

Pre-Load Applied to Side Pads

Figure 9:
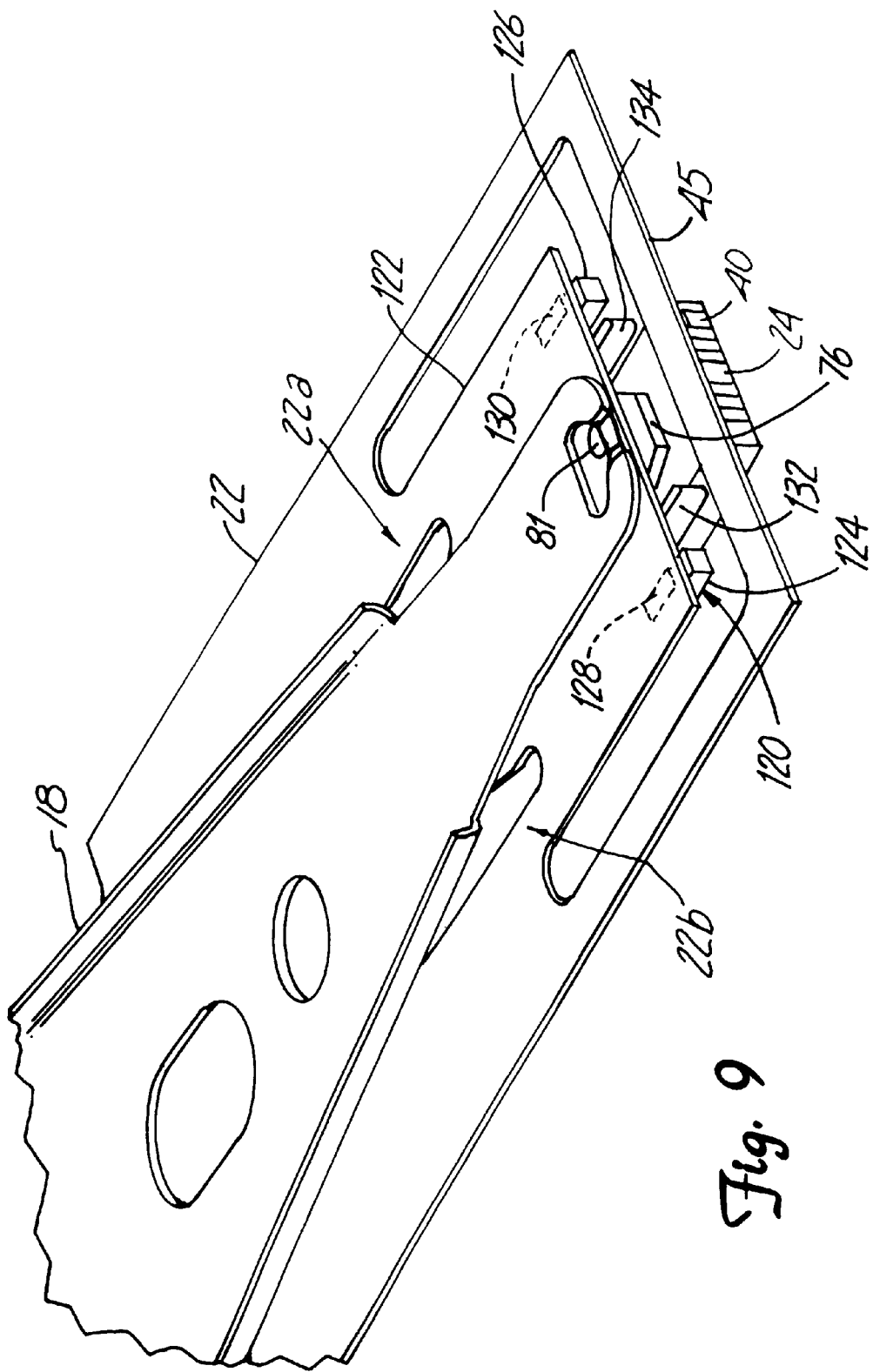
FIG. 9 is a top perspective view of a microactuator gimbal flexure for use with a disc drive microactuation system according to a third embodiment of the present invention.

In a third embodiment, depicted in FIG. 9, pre-load force is applied to side pads on opposite sides of slider 24. Pre-load force is applied by load beam 18 to a central bridge structure 122 of flexure 22 spanning over the surface of slider 24, so that the pre-load force is carried equally to side pads 124 and 126 of silicon suspension 120 through vertical abutments 128 and 130, respectively. Side pads 124 and 126 are aligned with the air-bearing center of pressure of slider 24, so that only a vertical pre-load force need be applied to bridge 122. Side pads 124 and 126 are essentially silicon extensions of the stator, remaining stationary with respect to the stator, and vertical abutments 128 and 130 are preferably posts formed on side pads 124 and 126 and later may optionally be attached to bridge structure 122 of flexure 22 by solder reflow or an alternative adhesion technique known in the art. Silicon suspension 120 further includes folded beams 132 and 134 to provide additional offtrack flexibility. Where pre-load force is applied to the side pads in this manner, silicon suspension 120 and bridge structure 122 must sustain a load of up to 4 grams of force in the vertical direction for an exemplary slider design. Several suitable configurations of silicon suspension 120 are disclosed in the aforementioned U.S. application Ser. No. 09/071,611 which has been incorporated herein by reference.

Figure 10:
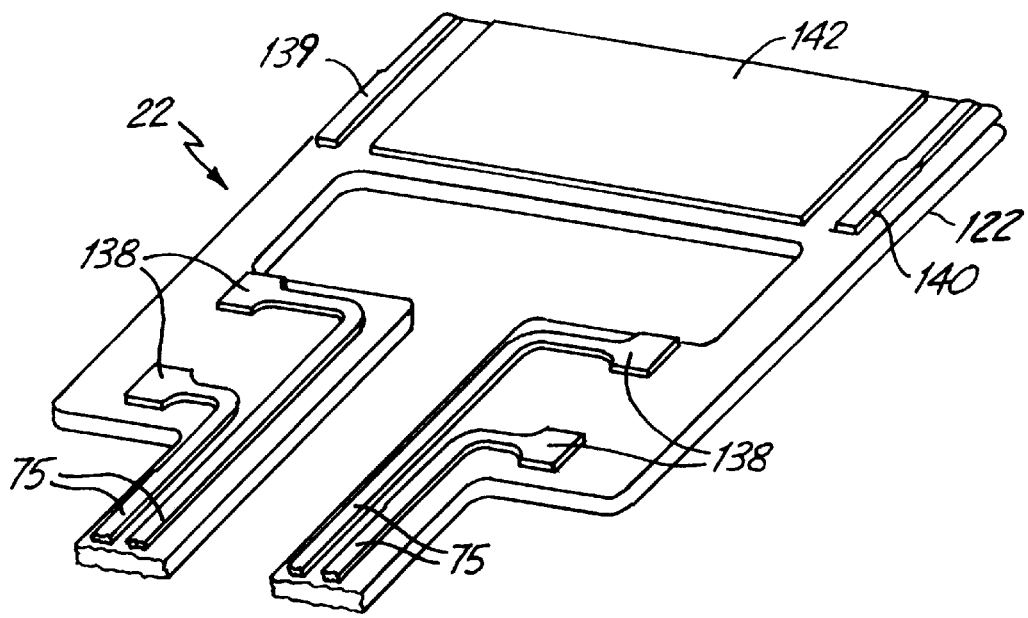
FIG. 10 is a bottom perspective view of a portion of a gimbal flexure illustrating a pattern of conductive traces according to a fourth embodiment of the present invention.

FIG. 10 is a bottom perspective view of a portion of flexure 22 illustrating a pattern of conductive traces 75 on central bridge structure 122 according to a fourth embodiment of the present invention. Conductive traces 75 terminate at terminals 138 for connection to bond pads 68 (FIG. 5). Side pad bonding pads 139 and 140 are provided, formed of solder, for example, for application of pre-load force to the silicon suspension of the microactuator. Plate 142, formed of gold-plated copper, for example, is formed on bridge 122 to reinforce bridge structure 122. Plate 142 is separated by gaps from side pad bonding pads 139 and 140 to ensure that the solder is localized in the desired areas.

Figure 11:
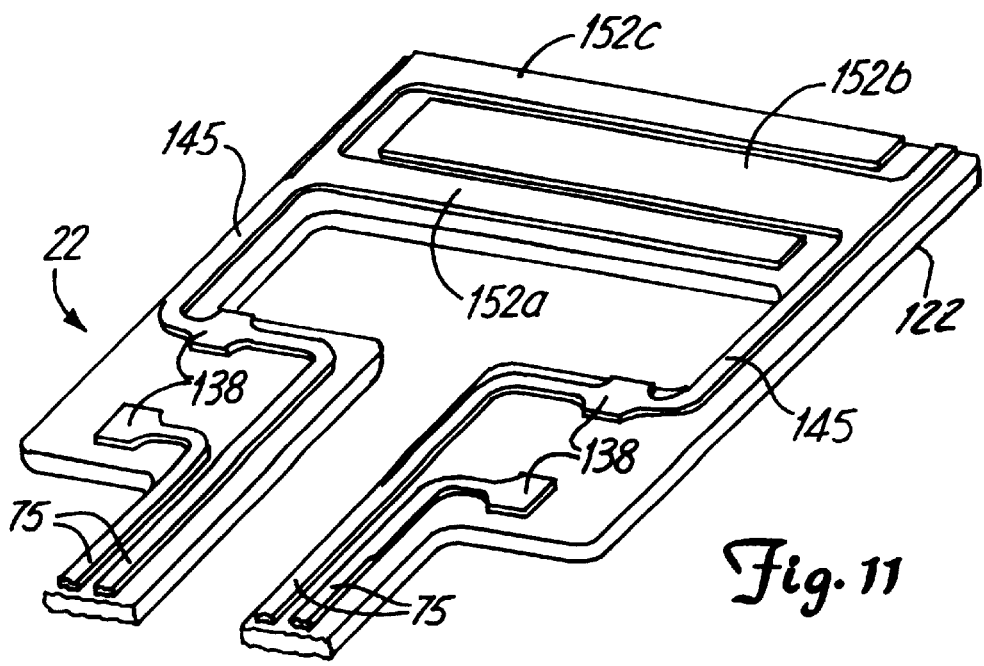
FIG. 11 is a bottom perspective view of a portion of a gimbal flexure illustrating a pattern of conductive traces according to a fifth embodiment of the present invention.

FIG. 11 is a bottom perspective view of a portion of flexure 22 illustrating a pattern of conductive traces 75 and 145 on central bridge structure 122 according to a fifth embodiment of the present invention. Conductive traces 75 terminate at terminals 138 for connection to bond pads 68 (FIG. 5). Conductive traces 145 are also connected to terminals 138, and include parallel appendages 152a, 152b and 152c extending perpendicular to conductive traces 145 on bridge 122. Appendages 152a, 152b and 152c are preferably formed by gold plating in the same step as plating of conductive traces 75 and 145, and may be formed without an intermediate seed layer. Conductive traces 145 provide the side pad bonding pad structure for application of pre-load force to the silicon suspension of the microactuator. In order to implement the embodiment shown in FIG. 11, bridge abutments 128 and 130 (FIG. 9) are insulative, to prevent corruption of the microactuator power signal on conductive traces 145 and 75 and terminals 138.

Figure 12:
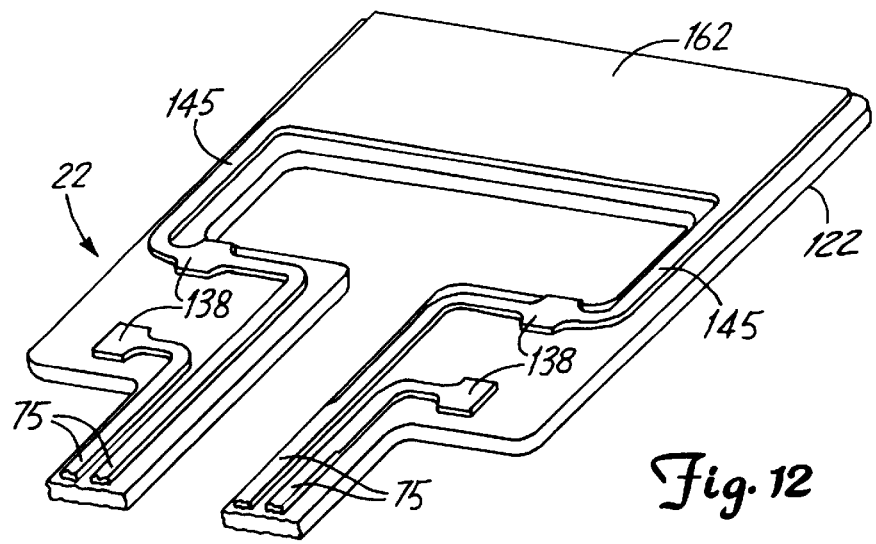
FIG. 12 is a bottom perspective view of a portion of a gimbal flexure illustrating a pattern of conductive traces according to a sixth embodiment of the present invention.

FIG. 12 is a bottom perspective view of a portion of flexure 22 illustrating a pattern of conductive traces 75 and 145 on central bridge structure 122 according to a sixth embodiment of the present invention. Conductive traces 75 terminate at terminals 138 for connection to bond pads 68 (FIG. 5). Conductive traces 145 are connected to a pair of terminals 138, and are connected across bridge 122 by plate 162. Plate 162 is formed of gold-plated copper (preferably in the same step as plating of conductive traces 75 and 145), for example, to reinforce bridge structure 122. Plate 162 forms a ground plane for the microactuator at one pair of terminals 138, with the microactuator power signals being provided at the other pair of terminals 138. Conductive traces 145 provide the side pad bonding pad structure for application of pre-load force to the silicon suspension of the microactuator.

Figure 13:
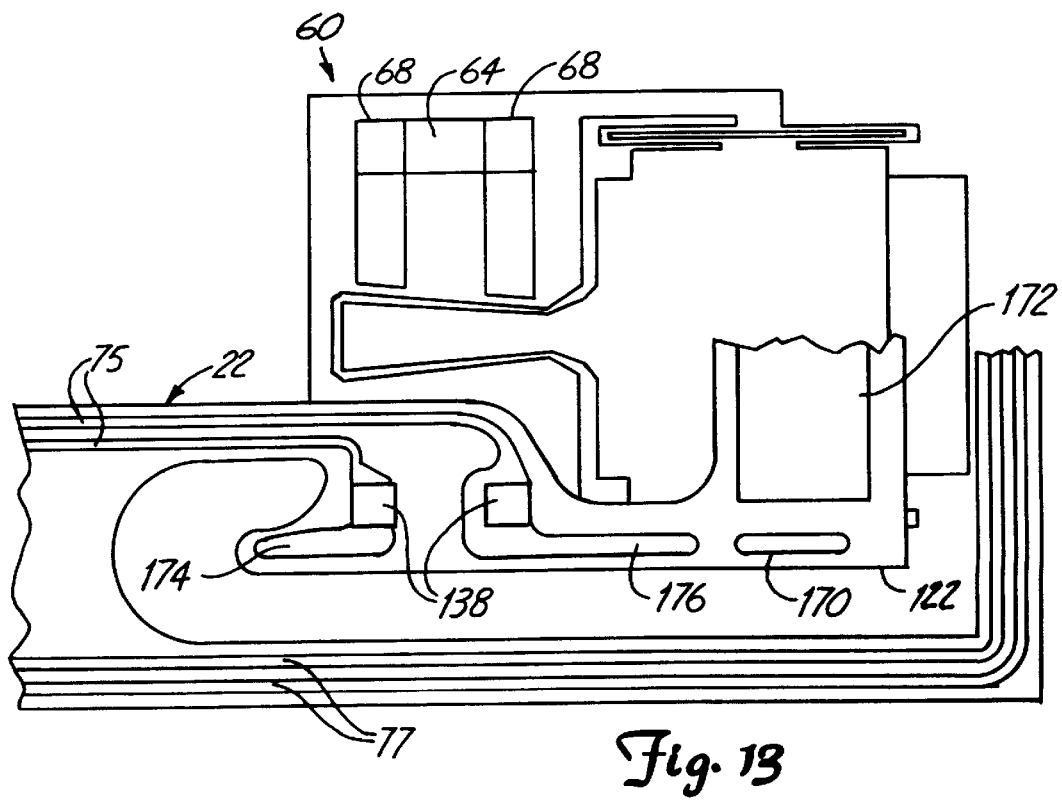
FIG. 13 is a partially broken away top view of a microactuator and gimbal flexure illustrating a pattern of conductive traces having cooling fins according to a seventh embodiment of the present invention.

FIG. 13 is a partially broken away top view of microactuator 60 and flexure 22 illustrating a pattern of conductive traces 75 having cooling fins 174 and 176 according to a seventh embodiment of the present invention. Central bridge structure 122 is provided with conductive traces 75, side pad bonding pads 170 and plate 172, similar to conductive traces 75, side pad bonding pads 140 and plate 142 shown in FIG. 10. Conductive traces 77 provide electrical connection to head 40 (FIGS. 3 and 4). Conductive traces 75 terminate at terminals 138 for connection to bond pads 68 (FIG. 5). Cooling fins 174 and 176 extend further from terminals 138 to provide additional exposed conductive surface area around terminals 138. Cooling fins 174 and 176 therefore improve the convective cooling of heat generated in the coil windings of microactuator 60, without having a significant effect on the stiffness of gimbal flexure 22.

In an alternative embodiment, conductive traces 75 and 77 may be plated on both the top and bottom sides of gimbal flexure 22, connected by a conductive via in a conventional manner. This arrangement allows cooling fins 174 and 176 to be formed on both sides of gimbal flexure 22 as well, increasing the total cooling fin surface area. This arrangement also increases the stiffness of central bridge structure 122. Bridge 122 may also be stiffened by applying a photoimageable polyimide covercoat, cured in areas where insulation between conductive features is desired.

Conductive traces 77 may be routed only along one side of gimbal flexure 22, preferably along the side of gimbal flexure 22 that is furthest from axis 32 of disc 30 (FIG. 1). This arrangement allows gimbal flexure to be asymmetrical, with less radial extension on the side closest to disc axis 32, enabling access to tracks 34 of disc 30 closer to disc axis 32, effectively increasing the storage capacity of disc 30.

The present invention therefore provides a gimbal flexure for electrically connecting and mechanically supporting a microactuator in a disc drive system. The gimbal flexure provides an efficient electrical path for connection to both the microactuator terminals and the transducing head supported by the slider, and has appropriate mechanical stiffness characteristics consistent with the aerodynamic requirements for "flying" the slider over the surface of a rotating disc.

Although the present invention has been described with reference to preferred embodiments, workers skilled in the art will recognize that changes may be made in form and detail without departing from the spirit and scope of the invention.

What is claimed is:

1. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:

a movable actuator arm;

a load beam connected to the actuator arm;

a flexure connected to the load beam for supporting the slider, including a first arm proximal to the axis of the recording disc and a second arm distal from the axis of the recording disc, a central bridge connected between the first and second arms, a cross beam connecting a distal end of the first and second arms, first conductive traces on the central bridge terminating at first bond pads and at least one second conductive trace on at least one of the first and second arms electrically connected to the transducing head; and a microactuator including a rotor operatively connected to the slider for moving the transducing head and a stator connected to the central bridge of the flexure at the first bond pads.

2. The disc drive of claim 1, wherein the first conductive traces are less than half the length of the second conductive traces.

3. The disc drive of claim 1, wherein the second conductive trace is disposed on both the first and second arms of the flexure.

4. The disc drive of claim 1, wherein the second conductive trace is disposed on only the second arm of the flexure.

5. The disc drive of claim 1, wherein the cross beam is severed at its center.

6. The disc drive of claim 1, wherein the central bridge includes a reinforcing plate.

7. The disc drive of claim 1, wherein the microactuator further includes a microactuator suspension having first and second side pads and first and second vertical abutments for applying pre-load force to the first and second side pads.

8. The disc drive of claim 7, wherein the central bridge includes first and second side pad bonding pads for applying pre-load force to the first and second side pads through the first and second vertical abutments.

9. The disc drive of claim 8, wherein the first and second vertical abutments are bonded to the first and second side pad bonding pads, respectively.

10. The disc drive of claim 8, wherein the first and second vertical abutments are insulated from the first and second side pad bonding pads.

11. The disc drive of claim 8, further comprising a reinforcing plate that is electrically isolated from the first and second side pad bonding pads.

12. The disc drive of claim 1, wherein the first conductive traces include portions that extend beyond the first bond pads to form side pad bonding pads and reinforcing bars on the central bridge.

13. The disc drive of claim 12, wherein the side bonding pads and the reinforcing bars are connected by a plate forming an electrical ground plane.

14. The disc drive of claim 1, wherein the central bridge includes a reinforcing plate on a top surface and a bottom surface thereof.

15. The disc drive of claim 1, wherein the central bridge includes at least one photoimageable covercoat.

16. The disc drive of claim 1, wherein the first conductive traces extend beyond the first bond pads and curve back to connect to the first bond pads.

17. The disc drive of claim 1, wherein the first conductive traces extend beyond the first bond pads with an increased width to form first cooling fins on a first surface of the flexure.

18. The disc drive of claim 17, further comprising second cooling fins on a second surface of the flexure opposite the first surface of the flexure, the second cooling fins being electrically connected to the first cooling fins by at least one via through the flexure.

19. The disc drive of claim 1, wherein the flexure further includes an aperture, and further comprising a ball interposed between the load beam and the slider in the aperture to apply pre-load force to the slider.

* * * * *